March 5, 1963  T. F. MacDONNELL  3,079,790
YARN TESTING APPARATUS
Filed April 19, 1960  3 Sheets-Sheet 1
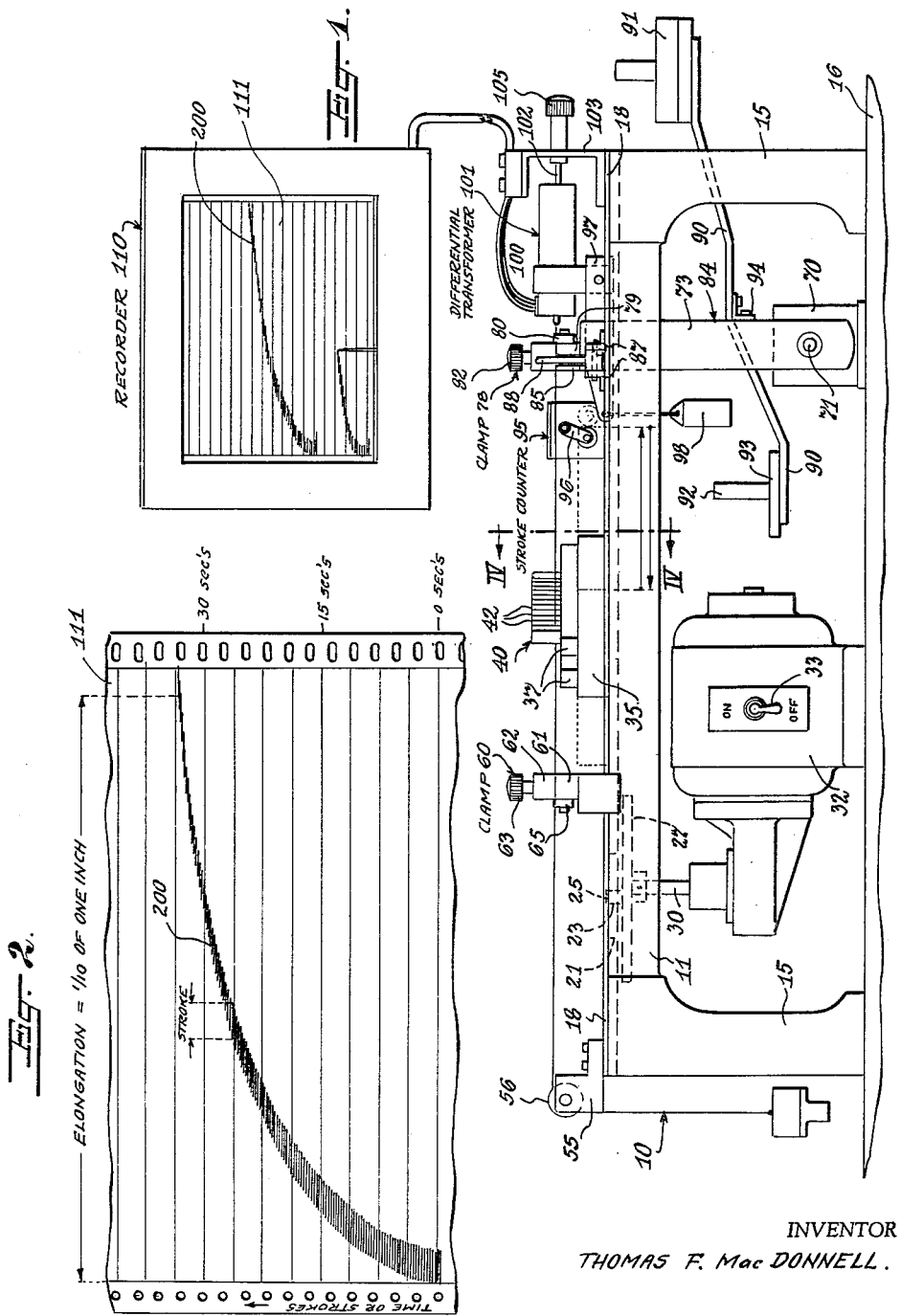
INVENTOR
THOMAS F. MacDONNELL.
BY Angelo M. Pisarra
ATTORNEY

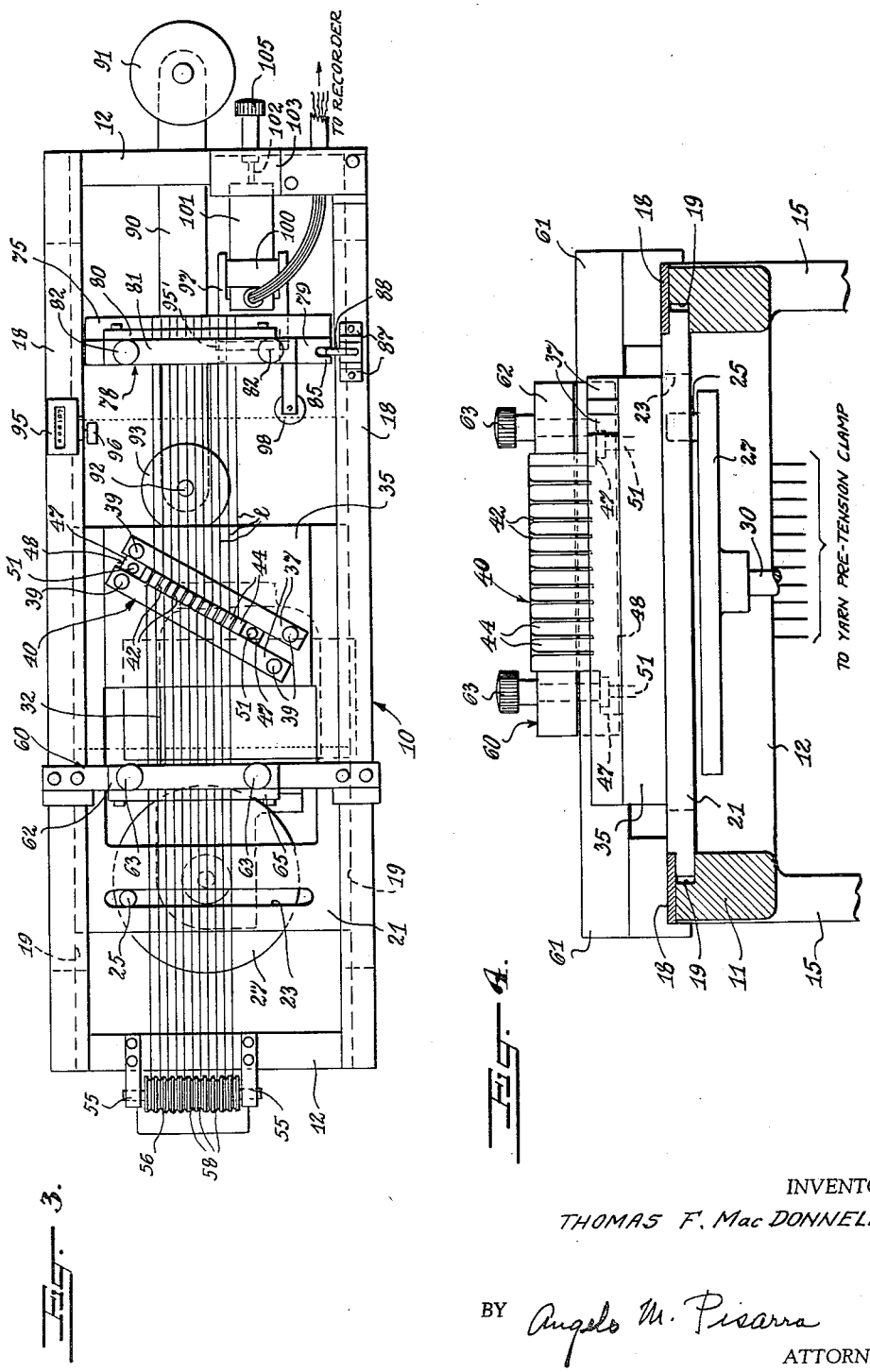

March 5, 1963     T. F. MacDONNELL     3,079,790
YARN TESTING APPARATUS

Filed April 19, 1960     3 Sheets-Sheet 3

INVENTOR
THOMAS F. MacDONNELL
BY Angelo M. Pisarra
ATTORNEY

United States Patent Office 3,079,790
Patented Mar. 5, 1963

3,079,790
YARN TESTING APPARATUS
Thomas F. MacDonnell, Newark, N.J., assignor to Nopco Chemical Company, Newark, N.J., a corporation of New Jersey
Filed Apr. 19, 1960, Ser. No. 23,193
10 Claims. (Cl. 73—95)

This invention is directed to apparatus and methods for testing yarns. In one of its more specific aspects the invention is directed to novel apparatus and methods for ascertaining one or more characteristics of various materials and especially of spun yarn. The apparatus also may be used to ascertain physical characteristics of such other materials, such as continuous filament yarns, and the like.

Spun yarns have been known and produced for hundreds of years and still are being produced in very large quantities. They have been composed of natural and/or synthetic fibers such as silk, cotton, wool, nylon, Dacron, acetate, etc. For many years spun yarns have carried a finish and also a size, and for these many years prior to this invention, it has not been possible to ascertain readily and with accuracy the effect of the finish and/or size on such yarns. Therefore, the present invention was made to provide apparatus for readily and accurately ascertaining the effect of any particular finish and/or size on spun yarns in particular and also on the so-called filament yarns. The present invention may be employed especially to ascertain the surface adhesion of warp size to spun yarn and also the effect of spin finish on the size adhesion to yarn. By employing the novel apparatus of the present invention there may be produced permanent records for ascertaining said characteristics. Said permanent records may be kept and thereafter used for comparative purposes with other permanent records subsequently obtained in the testing of other like and unlike materials.

An illustrative embodiment of the novel apparatus is shown in the accompanying drawings, wherein:

FIG. 1 is a view in side elevation of apparatus embodying the present invention, and on the graph chart there are shown two curves made as a result of two test runs of the apparatus on two different materials.

FIG. 2 is an enlarged view of a curve obtained on the strip chart of the recorder shown in FIG. 1 on a test run of a particular material.

FIG. 3 is a top plan view of the apparatus shown in FIG. 1 but with the recorder omitted.

FIG. 4 is a view taken on line IV—IV of FIG. 1 in the direction of the arrows.

Figure 5:
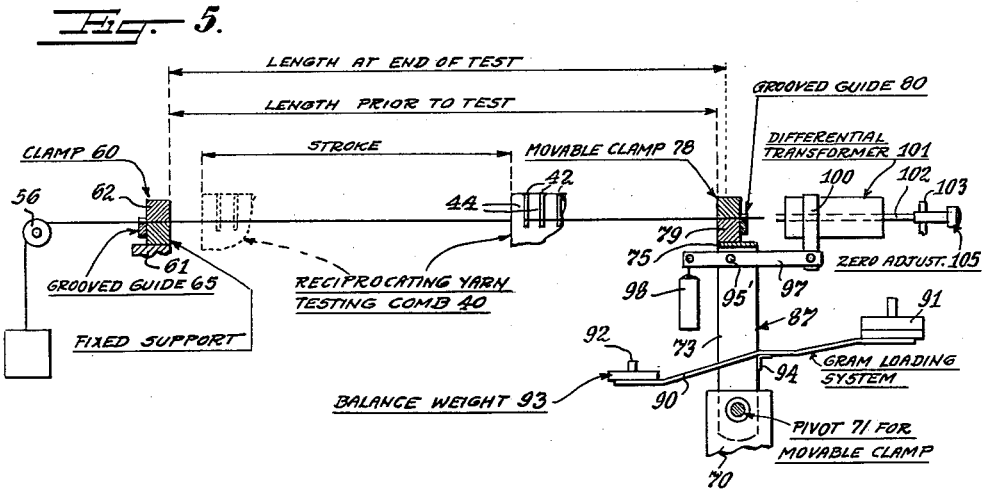
FIG. 5 is an incomplete fragmentary view partially in vertical-longitudinal cross section and partially diagrammatic of the apparatus shown in FIG. 1 and shows some of the parts relative to the other parts thereof and the position of the reciprocable comb at the beginning and end of each stroke thereof.
Figure 6:
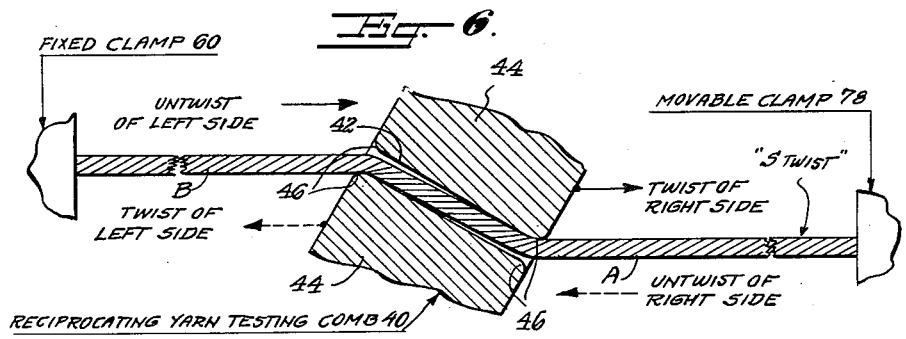
FIGS. 6 and 7 are fragmentary cross sectional views transversely through a pair of teeth of the reciprocable comb and through foreshortened yarns lengthwise thereof.
Figure 7:
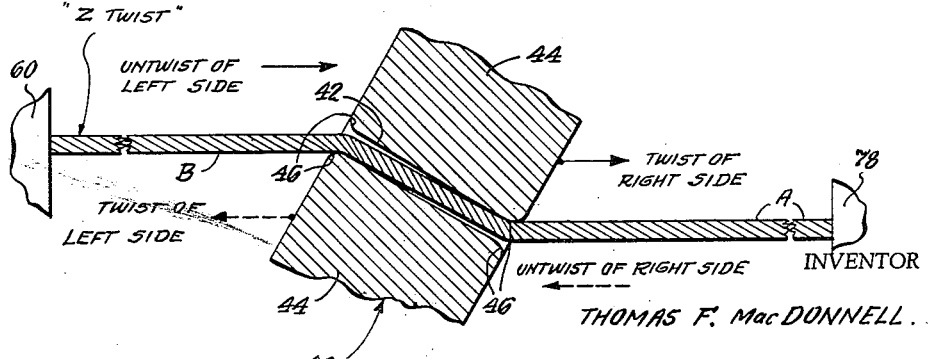

As shown in the drawings, the novel apparatus comprises a rectangular rigid supporting frame 10 consisting of a pair of elongated sides 11 and a pair of ends 12 rigidly secured to each other. Said frame 10 is maintained in elevated horizontal position by corner legs 15 secured thereto at the corners thereof and resting and secured to a table top or other support 16. Each of the sides 11 has a shallow cut-out extending the length thereof and secured to the top face of each of said sides 11 is an elongated plate 18 which with side 11 forms an elongated slot 19 extending along the inner side of frame 10 throughout substantially the entire length thereof. Mounted in said slots or tracks 19 is a reciprocable plate support or carriage 21 extending across said frame 10 and being slideable back and forth in tracks 19 along the length thereof. The rear end of the carriage 21 has an elongated opening 23 therethrough. Said opening 23 extends transversely of the path of travel of plate 21 and receives an actuator boss or drive pin 25 which is located therein and is rigidly connected to a rotatable disc 27. The disc 27 is connected to a vertically disposed shaft 30 operatively connected to the drive shaft of a constant speed electric motor 32 connected to an A.C. source of supply. The motor 32 is supported on support 16 and has switch 33 for rendering the motor 32 operative and inoperative. Rigidly mounted on and secured to the plate 21 is a flat plate 35 carrying on the upper face thereof a pair of locking bars 37 which are rigidly secured thereto by suitable locking bolts 39 or other appropriate means. Disposed between the bars 37, resting on plate 35 and extending above the upper faces of the bars 37 is a slotted element which has been additionally otherwise machined to provide a rigid comb 40. The comb 40 is a rigid element having a plurality of like vertical parallel slots 42 extending through the upper face thereof to provide a plurality of like teeth 44, with the vertical corners 46 of each of said teeth being of the same arcuate contour in horizontal cross section as shown in FIGS. 6 and 7. As shown the slots 42 are at right angles to the longitudinal center line of the comb. The comb 40 as shown includes a pair of end lugs 47. As shown in FIGS. 3 and 4, the comb 40 is disposed between the spaced locking bars 37, with the base 48 of the comb, which extends beyond the teeth 44 thereof to provide the lugs 47, lying flat-wise on the upper flat face of the plate 35, and the external flat vertical faces of the comb bearing flat-wise against the inner faces of the locking bars 37. The comb 40 is locked in said position by a pair of locking bolts 51 or other appropriate means extending through openings in lugs 47 and into threaded openings in plate 35. As shown in FIG. 2 the locking bars 37 are disposed at an angle to the longitudinal center line of the frame or the path of travel of the plate 35 in its normal path of reciprocation. Such angle is preferably such that the slots 42 are disposed in the range of about 60° to 70° and preferably at approximately 65° to the path of reciprocation of the comb. The plate 35 may have arcuate slots or other means, not shown therein so that the comb and lock bars may be adjustably secured to plate 35 to vary said angle of the comb as desired. As shown in the drawings and especially in FIGS. 6 and 7, the arcuate edges of the teeth of the comb are disposed generally as therein shown, with an arcuate edge 46 of one tooth being disposed forwardly of and transversely from the arcuate edge 46 of the adjacent tooth, thus to provide a yarn bearing surface 46 of one tooth spaced longitudinally and transversely from a yarn bearing surface 46 of an adjacent tooth, so that if a straight line is drawn between said two bearings 46, it is at an angle of about 60°-70° to the path of travel of the comb.

Rigidly mounted on the rear end plate 12 are a pair of spaced supporting elements 55 extending rearwardly thereof and carrying therebetween a freely-rotatable roller 56 having a plurality of like circumferential parallel grooves 58 in the outer face thereof. Located between the roller 56 and support 35 and extending above and across the frame 10 is a stationary clamp 60 consisting of a lower stationary or fixed bar 61 and a removable upper bar 62 carrying a pair of locking bolts 63. Secured on the rear face of the stationary bar 61 is a guide strip 65 having a plurality of spaced guide grooves therein.

Near the forward end of the frame 10, disposed therebelow and mounted on the support 16 is a support 70 having a pivot 71 extending out of each end thereof. A pair of members 73 are pivotally mounted at the lower ends thereof on said pivots 71 and extending upwardly therefrom. Secured to the upper ends of swingable members 73 is a cross piece 75 carrying a movable clamp 78 located in the space between the sides 11 of the frame. The lower jaw 79 of clamp 78 is rigidly secured to the cross element 75, and secured to the forward side of jaw 79 is a groove guide 80. The clamp 78 includes also an upper jaw 81 which may be coupled with and uncoupled from jaw 79 by bolts 82. Secured to and extending outwardly from one end of the jaw 79 is a spring clip 85, and adjacent thereto and secured to an element 18 by brackets 87 is a pivoted element 88, which when in one position as shown in FIG. 2 is in spring-clip engagement with clip 85 to latch the clamp 78 to frame 10. The tongue of element 88 may be swung away from clip 85 to unlatch the clamp 78 from the rigid frame 10. By moving element 88 to operative or inoperative position the swingable inverted U-shaped swingable or arch support 84 consisting of legs 73 and crosspiece 75 carrying the clamp 78 and grooved guide 80 may be latched to or unlatched from the frame 10.

Mounted at a position between clamps 60 and 78 and on an element 18 is a stroke counter 95 having a tripping element 96 actuable by the reciprocable carriage carrying comb 40 for counting the number of strokes made by said comb. Rigidly secured to the legs 73 by a bracket support 94 at a position above support 70 and near pivots 71 is element 90 having a spindle at one end for receiving loading weights 91 and a spindle 92 at the other for receiving balancing weights 93 which act as a loading system for the arch support 84. The upper end of one of said legs 73 carries a pivot rod 95'. Pivotally carried by rod 95' is a double fork lever 97 with one of the tines of the rear fork being longer than the other and having a counter weight 98 pivotally depending therefrom. The tines of the front fork are pivotally connected to the legs of a strap 100 rigidly secured to a casing fixedly connected to the coils of a differential transformer 101 which also includes an adjustable stationary armature rod 102 maintained in position on a bracket 103 supported at the rear end of frame 10, so that horizontal movement of clamp 78 in either direction causes a corresponding movement of the transformer coils and casing relative to armature rod 102. Extending rearwardly from the bracket 103 is a screw adjustor having a knurled head 105 which may be turned to adjust the armature rod 102 horizontally in either direction. The transformer 101, for the purposes of illustration, may be an "Atcotran" differential transformer such as Type 6208A suitable for measurement of substantially straight line motions and for converting variations in length into signals suitable for electrical transmission. The input side of the transformer 101 is connected to an A.C. source of supply and the output side thereof is electrically connected to a graph strip recorder 110. The recorder 110 is connectable to an A.C. source of supply. A type of such recorder found suitable and given merely by way of example is Atcotran Receiver Range 0–50, volts 150, 60 cycles, Cat. Number R5030, Type 6141–1BA-CO, Serial Number H10740. The recorder 110 is well known to those skilled in the art and includes a graph strip 111 which is feedable at a constant rate and means for recording thereon variations in the distance between the clamps 60 and 78 or variations in the length of the yarn lengths held under tension between said clamps due to the variations in the output signals from said differential transformer caused by movement of the casing and coils thereof with respect to its armature by movement of said clamp 78 with respect to said clamp 60.

In operation, the yarn lengths 1 are mounted on the apparatus as shown in the drawings. In general, a load 91 of approximately 300 grams for example is mounted on the spindle of the support 90 and the latch pin 88 is in operative position as shown in FIG. 1. From a spool of yarn to be tested, a sample length thereof is cut off and in turn cut into 5 lengths which are folded over into U shape and another length having a loop at one end. The jaws 62 and 81 are removed and the U-shaped yarns are respectively laid over teeth of the grooved element 80 and the loop of the other length is looped on the last tooth of said element 80. The individual lengths of yarn are extended over the jaw 79, through the respective spaces between the teeth 46 of the comb 40 over the jaw 61 in the respective grooves of guide 65, in the respective grooves 58 of the freely-rotatable roller and extend therebelow. Then there is secured to each end of the individual yarns below roller 56 a tensioning weight which may be 12 grams for example thereby to render taut the individual yarns and place them under some tension. The comb 40 is now moved back and forth two or three times thereby to assure that all of the yarns are under said 12 gram tension throughout the length of each of them. The jaws 62 and 81 are now placed in operative position and their locking bolts 63 and 82 are turned down thereby to clamp and lock the portions of the individual yarn lengths 1 between the jaws 61—62 and 79—81 in position as shown in FIG. 1. When the yarn lengths 1 are locked in position as aforesaid by the supports or clamps 60 and 78, the individual yarn lengths 1 between the clamps are in particular spaced relationship to each other, with the portions thereof forwardly of the comb being in approximately parallel relationship to each other, and the portions thereof rearwardly of the comb being in approximately parallel relationship to each other, and the portions or stretches thereof through the comb also being in approximately parallel relationship to each other, and being at an angle of about 60°–70° and preferably about 65° to those portions thereof outside of said comb. The latching pin 88 is swung out of clip 85 and down to inoperative position while the arch support 84 is held and then permitted slowly to swing slightly away from clamp 60. Then the arch 84 is completely released and due to the load 91, the yarn lengths 1 are maintained under a constant tension between supports 60 and 81. The comb 40 may again be reciprocated two or three times to assure the operator that all of the yarn lengths 1 are under the same load or tension. The counter 95 is set at zero and the means for measuring and recording the changes in length of the yarn lengths 1, that is the differential transformer and recorder are adjusted for zero setting, the recorder switch is actuated as is the switch 33 of the motor 32, all simultaneously. Thereupon strip 111 is fed at constant speed and the constant speed drive shaft 30 is driven, to rotate disc 27 which in turn drives the boss 25 in slot 23 to drive the carriage and comb 40 back and forth at a constant speed of 86 strokes per minute which is recorded on the counter whose tripper is actuated thereby. In the course of said reciprocation of comb 40, the individual yarn lengths are subjected to a constant rubbing and bending action at the bearing surfaces 46 of the teeth and also to both constant twisting and untwisting whereby the length of the individual yarn lengths 1 increase, the increase in yarn lengths is sensed by the differential transformer due to the movement of support 81 and recorded on the traveling strip chart 111 of the recorder so that a curve is made on the strip 111.

In operation of the apparatus, each of the eleven yarn lengths 1 is subjected to the same action. Assuming that the yarn lengths 1 has a right hand twist, that is S twist, for example, and referring to FIG. 6, when the comb 40 is traveling away from the fixed clamp 60 and in the direction of the solid arrows shown in FIG. 6, while parts of the portion thereof in the space between the teeth 44 are in contact with the bearing surfaces 46, are rubbed and bent thereat, the leading bearing surface 46 causes the stretch A thereof to have additional right hand twist imparted thereto, and the follower bearing surface 46 exerts an opposite effect on the stretch B thereof thereby to impart an untwisting action thereto. Such twisting and untwisting actions occur simultaneously throughout the length of travel of the comb in the direction of the solid arrow as shown in FIG. 6. Then when the comb 40 reverses its direction of travel in the direction shown in dotted lines in FIG. 6, the now leading bearing surface 46 imparts a twisting action to stretch B and untwisting action to stretch A.

If, however, the yarn length was one having a left hand twist, that is Z twist, for example and referring to FIG. 7, when the comb is traveling away from the fixed clamp 60 and in the direction of the solid arrows shown in FIG. 7, while parts of the portion thereof in the space between the teeth 44 are in contact with the bearing surfaces 46, are rubbed and bent thereat, the leading bearing surface 46 causes the stretch A thereof to have additional left hand twist imparted thereto, and the follower bearing surface 46 exerts an opposite effect on the stretch B thereof thereby to impart an untwisting action thereto. Such twisting and untwisting actions occur simultaneously throughout the length of travel of the comb in the direction of the solid arrow as shown in FIG. 7. Then when the comb 40 reverses its direction of travel in the direction shown in dotted lines in FIG. 7, the leading bearing surface 46 now imparts a twisting action to stretch B and untwisting action to part A.

Due to the bending and rubbing of the individual yarns at the bearing surfaces 46 and due to the simultaneously twisting and untwisting thereof in the course of reciprocation of the comb, the length of the yarn lengths 1 under the load 91 increases after each full stroke. Because of such increase in length of the yarn lengths 1 the movable clamp 78 on arch support 84 swings further and further away from the stationary clamp 60 thereby to actuate the coils of the differential transformer thereby to vary the output circuit thereof, and the such increase in distance, which is substantially the change in length of the yarn lengths 1, actuates said coils to vary the output signals from the differential transformer fed to the recorder 110. A recording pen (not shown) of recorder 110 is actuated in response to said variations of signals from said transformer thereby to record on graph strip 111 a curve showing said variations in length of said lengths of yarn 1 maintained under constant load between supports 60 and 80. Both recorder 110 and motor 32 are stopped when the elongation of yarns 1 is one-tenth of an inch, for example. In this manner, a permanent record is produced of variations in length of lengths of yarn 1 versus time or number of strokes under a particular and constant load.

Referring to FIG. 2, a curve 200 obtained by following the method before set forth is a permanent record of a particular spun yarn and shows that the elongation gradient over the first 27 seconds or 40 strokes is fairly low, that there was a length increase of less than one-twentieth of an inch in that period and that the elongation gradient over the next 7.5 seconds or 11 strokes was greater and there was an elongation of more than one-twentieth of an inch in that period. The curve further shows that a one tenth of an inch elongation of the yarns under said conditions of test occurred when the reading of the counter 95 was 51 strokes. The curve 200 is a permanent record which may be interpreted by those skilled in the art and also may be employed for comparative purposes.

The motor and recorder are now stopped, the yarn lengths 1 removed and other yarns may be tested under the same conditions as before by following the aforesaid operations and a curve is produced which may be compared with the preceding curve if desired.

It is to be understood that the present invention is not to be limited to the construction shown and described herein, for the same is given merely by way of illustration and not limitation, it being obvious that various changes and modifications may be made therein without departing from the spirit thereof.

I claim:

1. Apparatus of the class described comprising a first means for maintaining in fixed position a part of a length of yarn to be tested, second means for securing thereto another part of said length of yarn and for applying a load to said length of yarn between said first and second means for urging said second means from said first means thereby to maintain said length of yarn under tension, third means movable towards and away from said first means and inculding a plurality of bearing means, with one of said bearing means being disposed forwardly of and spaced transversely from another so that when a stretch of said length of yarn is disposed between said plurality of bearing means, said stretch is at an angle to the path of travel of said third means, with a portion of said stretch being in contact with said bearing means and another portion of said stretch being in contact with said other bearing means, said bearing means acting upon said length of yarn in the movement of said third means in one direction towards said first means to cause simultaneous twisting of progressively decreasing portions of said length of yarn between one of said bearing means and said first means and untwisting of progressively increasing portions of said length of yarn between said other bearing means and said second means, said bearing means acting upon said yarn in the movement of said third means in the opposite direction towards said second means to cause simultaneous twisting of progressively decreasing portions of said length of yarn between one of said bearing means and said second means and untwisting of progressively increasing portions of said length of yarn between said other bearing means and said first mentioned means whereby the lengthwise dimension of said length of said yarn between said first and second mentioned means is increased, said second means being movable away from said first means in response to said increase in the lengthwise dimension of said length of yarn, and means responsive to the movement of said second means away from said first means for recording the increase in length of said length of yarn due to the action of said bearing means thereon while said third means is reciprocating.

2. Apparatus of the class described comprising first means for securing a plurality of lengths of yarn to be tested at one of the ends thereof in spaced relationship to each other, second means for securing said lengths of yarn at the other ends thereof in spaced relation to each other, third means for urging said second means away from said first means thereby to maintain said lengths of yarn under tension, fourth means movable towards and away from said first means and including a plurality of sets of yarn bearing surfaces, with each of said sets comprising a pair of yarn bearing surfaces with one of said surfaces being spaced forwardly of and transversely from the other so that when portions of said lengths of yarn are respectively disposed in said spaces, a part of a portion in the space will be in contact with one of said surfaces of a set and another will be in contact with the other surface of said set, said yarn bearing surfaces acting upon said lengths of yarn in the movement of said fourth means towards and away from said first means to cause simultaneous twisting of the portions of said lengths of yarn ahead of said bearing surfaces and untwisting of the portions of said lengths of yarn behind said bearing surfaces in the course of travel of said fourth mentioned means towards and away from said first means whereby the lengthwise dimension of said lengths of yarn is increased, means responsive to movement of said second means away from said first means for recording increase in length of said yarns due to the action of said bearing surfaces on said yarns during reciprocation of said fourth means.

3. Apparatus of the class described comprising first means for maintaining the ends of a plurality of lengths of yarn to be tested in fixed position and in spaced relation to each other, second means for maintaining the other ends of said lengths of yarn in spaced relation to each other and for maintaining said lengths of yarn under tension, a comb for receiving a portion of said lengths of yarn in the spaces between the teeth thereof, with at least a portion of said teeth being in contact with said portion of said lengths of said yarn, said comb being movable toward and away from said first means with said teeth thereof being in contact with said lengths of yarn thereby acting upon said yarn to cause simultaneous twisting of those portions of the lengths of said yarn ahead of said comb and untwisting of those portions of the lengths of said yarn behind said comb in its travel towards and away from said first mentioned means thereby to cause change in the lengthwise dimension of said lengths of yarn being tested, said second means being movable with respect to said first mentioned means in response to said change in the lengthwise dimension of said lengths of yarn and means responsive to movement of said second means for recording said change in length.

4. Apparatus of the class described comprising first means for maintaining the ends of a plurality of lengths of yarn to be tested in a fixed position, second means for securing the other ends of said lengths of yarn thereto and for applying a load thereto thereby urging said second means away from said first means to maintain said lengths of yarn under tension, a plurality of sets of bearing means reciprocable in unison, with each of said sets comprising a plurality of bearing means, with one of said bearing means being disposed forwardly of and transversely from another so that when said lengths of yarn are coupled with said sets, a stretch of an individual length of yarn is in contact with both of said bearing means of one set and a stretch of another length of yarn is in contact with both of said bearing means of another set thereby to maintain said stretches at an angle to the path of travel of said sets when said sets are reciprocating, said bearing means acting upon said lengths of yarn in their reciprocation to cause simultaneous twisting of the portions thereof ahead of said bearing means and untwisting of the portions thereof behind said bearing means in the course of said reciprocation whereby there is an increase in the lengthwise dimension of said lengths of yarn, said second mentioned means being movable away from said first mentioned means upon said increase in the lengthwise dimension of said lengths of yarns, and means responsive to the movement of said second means away from said first means for recording the increase in length of said lengths of yarn upon elongation of said lengths of yarn caused by the action of said bearing means thereon during reciprocation of said sets of bearing means.

5. Apparatus of the class described comprising first means adapted to maintain in fixed position and in spaced relation to each other one of the ends of a plurality of lengths of yarn to be tested, second means adapted to maintain in spaced relation to each other the other ends of said lengths of yarn, said second means being movable towards and away from said first means, third means coupled with said second means for urging said second means away from said first means thereby to maintain said lengths of yarn under tension when one of the ends thereof are maintained by said first means in spaced relation to each other and the other ends thereof are maintained by said second means in spaced relation to each other, a plurality of teeth spaced from each other and being reciprocable in unison towards and away from said first means, each of said teeth including a plurality of bearing surfaces, with one of said surfaces being disposed forwardly of and transversely from another whereby when said lengths of yarn respectively are disposed in the spaces between said teeth when one of the ends of said lengths of yarn are maintained in fixed position and spaced relation to each other by said first means and the other ends thereof are maintained in spaced relation to each other by said second means and said lengths of yarn are under tension by the action of said third means upon said second means, a relatively short stretch of one of said lengths of yarn disposed in one of said spaces has a part thereof in contact with a bearing surface of one of said teeth and another part thereof in contact with a bearing surface of the other of said teeth which said bearing surface of one of said teeth is spaced forwardly of and transversely of said bearing surface of the other of said teeth, a relatively short stretch of another of said lengths of yarn disposed in another of said spaces has a part thereof in contact with a bearing surface of one of said teeth and another part thereof in contact with a bearing surface of another of said teeth, with said stretches being in approximate parallel relationship to each other, and the stretches of said lengths of yarn between said teeth and said first means being approximately parallel to each other and the stretches of said lengths of yarn between said teeth and said second means being approximately parallel to each other, said teeth acting upon said lengths of yarn in their reciprocation to cause simultaneous twisting of the portions thereof ahead of said teeth and untwisting of portions thereof behind said teeth in the course of their reciprocation thereby to cause an increase in the lengthwise dimension of said lengths of yarn, said second means being movable away from said first means in response to said increase in the lengthwise dimension of said lengths of yarn, and means responsive to movement of said second means away from said first mentioned means for recording increase in length of said lengths of yarn when maintained as aforesaid under tension and acted upon by said bearing surfaces in the reciprocation of said teeth.

6. Apparatus of the class described comprising a pair of supports adapted to maintain between them a plurality of lengths of yarn under tension, one of said supports being movable relative to the other, a comb adapted to accommodate said lengths of yarn in the spaces between the teeth thereof, thereby to maintain a stretch of said lengths of yarn respectively in said spaces at an angle of approximately 60°–70° to stretches of said lengths of yarn between said teeth and said supports, said comb being movable towards and away from one of said supports, to cause simultaneous twisting of portions of said lengths of yarn ahead of said comb and untwisting of portions of said lengths of yarn behind said comb upon movement of said teeth of said comb towards and away from one of said supports thereby to effect increase in the lengthwise dimension of said lengths of yarn, said movable support being movable away from said other support in response to the said increase in the lengthwise dimension of said lengths of yarn and means responsive to the movement of said movable support away from said other support for recording increase in length of said lengths of yarn due to the action of said teeth thereon in the reciprocation of said comb.

7. Apparatus of the class described comprising a pair of supports adapted to maintain between them under tension a plurality of lengths of yarn to be tested, one of said supports being movable away from the other, a plurality of sets of bearing surfaces movable in unison towards and away from one of said supports, each of said sets comprising a pair of bearing surfaces, with one of said surfaces so spaced forwardly and transversely from the other that a straight line drawn between said surfaces will be at an angle of about 60°–70° from the line of travel of said bearing surfaces when moving towards and away from one of said supports whereby when said lengths of yarn are respectively disposed in said spaces, short stretches thereof will be located in said spaces and have portions thereof in contact with said surfaces, said bearing surfaces acting upon said lengths of yarn upon movement thereof towards and away from one of said supports to cause simultaneous twisting of the portions of said lengths of yarn ahead of said surfaces and untwisting of the portions of said lengths of yarn behind said surfaces in the travel thereof towards and away from said one of said supports thereby effecting increase in the lengthwise dimension of said lengths of yarn, said movable support being movable away from said other support in response to said increase in the lengthwise dimension of said lengths of yarn, and means responsive to movement of said movable support for recording increase in the length of said lengths of yarn by the action of said bearing surfaces thereon during movement thereof towards and away from one of said supports.

8. Apparatus of the class described comprising a supporting frame, a reciprocable carriage supported by said frame, a plurality of sets of bearings carried by said carriage, first means carried by said frame, said means adapted to maintain in fixed position and in spaced relation to each other one of the ends of lengths of yarn to be tested, second means for securing thereto the other ends of said lengths of yarn and for maintaining under tension said lengths of yarn between said first and second means, said second means being movable towards and away from said first means, said sets of bearings disposed between said first and second means with each set comprising a pair of spaced bearings with one spaced forwardly of and transversely from the other and adapted to accommodate a short stretch of one of said lengths of yarn in the space between said bearings whereby said stretch is in contact with said bearings thereby to be disposed at an acute angle to the line of the path of travel of said carriage, said bearings acting upon said lengths of yarn during the reciprocation of said carriage to cause simultaneous twisting of the portions of said lengths of yarn ahead of said carriage and untwisting of the portions of the lengths of said yarn behind said carriage in the course of its reciprocation thereby effecting increase in the lengthwise dimension of said lengths of yarn, said second means being movable away from said first means in response to said increase in the lengthwise dimension of said lengths of yarn, and means responsive to the movement of said second means with respect to said first means for recording the increase in length of said lengths of yarn due to the action of said bearings thereon while said carriage is reciprocating.

9. Apparatus of the class described comprising a supporting frame, first means carried by said frame, said first means adapted to maintain in fixed position and in spaced relationship to each other one of the ends of a plurality of lengths of yarn to be tested, second means adapted to maintain the other ends of said lengths of yarn in fixed position to each other, said second means being movable away from said first means, third means coupled with said second means for urging said second means away from said first means thereby to maintain said lengths of yarn under tension, a carriage carried by said supporting frame and located between said first and second mentioned means, a comb carried by said carriage and movable therewith, means for moving said carriage back and forth in a path between said first and second means, said comb including a plurality of spaced teeth adapted to accommodate said lengths of yarn in said spaces, said spaces between said teeth being at an angle of about 60°–70° to the line of travel of said carriage, said teeth acting upon said lengths of yarn upon movement of said carriage back and forth to cause simultaneous twisting of the portions of the lengths of said yarn ahead of said teeth and untwisting of the portions of the lengths of yarn behind said teeth in the course of their movement back and forth thereby causing increase in the lengthwise dimension of said lengths of yarn, said second means being movable away from said first means in response to said increase in the lengthwise dimension of said lengths of yarn, means responsive to the movement of said second means for recording change in length of said lengths of yarn due to the action of said teeth upon said lengths of yarn during the reciprocation of said carriage, said means including a movable record receiving means and means for recording on said record receiving means the movement of said second means from said first means.

10. The method for testing yarn with an apparatus comprising a stationary support, a movable support tending to move away from said support, and a reciprocable comb comprising securing to said supports a plurality of individual lengths of yarn to be tested, with said lengths being disposed in substantially parallel relationship between said supports whereby said movable support maintaining said lengths of yarn under substantially constant tension, with short stretches of said lengths of yarn located in the respective spaces between the teeth of said comb, comprising reciprocating said comb towards and away from said stationary support to cause simultaneous twisting of the portions of said lengths of yarn ahead of said comb and untwisting of the portions of the length of yarn behind said comb to effect increase in the lengthwise dimension of said lengths of yarn, and subjecting a recording means to the action of the movement of said movable support upon said increase in lengthwise dimension of said lengths of yarn to record said increase in lengthwise dimension.

References Cited in the file of this patent

UNITED STATES PATENTS

| | | |
|---|---|---|
| 1,482,231 | Hasler | Jan. 29, 1924 |
| 2,900,818 | Starr | Aug. 25, 1959 |

FOREIGN PATENTS

| | | |
|---|---|---|
| 225,087 | Great Britain | Nov. 27, 1924 |